(12) United States Patent
Ilker

(10) Patent No.: US 11,634,053 B2
(45) Date of Patent: Apr. 25, 2023

(54) ANGLE MECHANISM PASSENGER SEAT SLEEPING PILLOW

(71) Applicant: Ayhan Ilker, Bursa (TR)

(72) Inventor: Ayhan Ilker, Bursa (TR)

(*) Notice: Subject to any disclaimer, the term of this patent is extended or adjusted under 35 U.S.C. 154(b) by 0 days.

(21) Appl. No.: 17/423,275

(22) PCT Filed: Jan. 13, 2020

(86) PCT No.: PCT/TR2020/050024
§ 371 (c)(1),
(2) Date: Jul. 15, 2021

(87) PCT Pub. No.: WO2020/149810
PCT Pub. Date: Jul. 23, 2020

(65) Prior Publication Data
US 2022/0063466 A1    Mar. 3, 2022

(30) Foreign Application Priority Data

Jan. 15, 2019 (TR) ................... 2019/00536

(51) Int. Cl.
*A47C 1/10* (2006.01)
*B60N 2/80* (2018.01)
*B60N 2/879* (2018.01)
*B60N 2/829* (2018.01)

(52) U.S. Cl.
CPC ..................... *B60N 2/829* (2018.02)

(58) Field of Classification Search
CPC ........ B60N 2/885; B60N 2/809; B60N 2/806; A47C 7/38
See application file for complete search history.

(56) References Cited

U.S. PATENT DOCUMENTS

| 5,868,471 A * | 2/1999 | Graham | B60N 2/882 |
| | | | 5/640 |
| 6,250,716 B1 * | 6/2001 | Clough | A47C 7/383 |
| | | | 297/391 |
| 7,040,705 B2 * | 5/2006 | Clough | A47C 7/383 |
| | | | 297/391 |
| 7,080,886 B2 * | 7/2006 | Bauer | B60N 2/885 |
| | | | 297/217.6 |

(Continued)

FOREIGN PATENT DOCUMENTS

DE    19 2009 021 267 A    11/2010

OTHER PUBLICATIONS

International Search Report, issued in PCT/TR2020/050024, dated Aug. 21, 2020.

(Continued)

*Primary Examiner* — Shin H Kim

(57) ABSTRACT

To ensure that passengers sleep in a good quality, comfortable and healthy sleep during their bus, airplane and train journeys and to prevent the eclipses occurring in the neck after the journey, a passenger seat sleeping pillow has an angled working principle in accordance with head and neck anatomy. The passenger seat with angle mechanism that can be produced in the system is related to the sleeping pillow and angle mechanism provides two types of assembly (FIG. 1) or (FIG. 2), optionally manual or motorized (FIG. 19), thanks to the variable apparatus enabling the assembly of the passenger seat during or after manufacturing.

11 Claims, 19 Drawing Sheets

(56) References Cited

U.S. PATENT DOCUMENTS

| | | | | |
|---|---|---|---|---|
| 7,393,057 B2* | 7/2008 | Fraser | .................... | B60N 2/885 |
| | | | | 297/392 |
| 8,911,020 B2* | 12/2014 | Westerink | .......... | B64D 11/0642 |
| | | | | 297/406 |
| 9,611,041 B2* | 4/2017 | Baker | ................ | B64D 11/0642 |
| 10,202,196 B2* | 2/2019 | Hontz | ................ | B64D 11/0642 |
| 10,327,554 B2* | 6/2019 | DuFresne | .............. | A61G 5/121 |
| 10,399,475 B2* | 9/2019 | Jalpa | ...................... | B60N 2/838 |
| 10,793,039 B2* | 10/2020 | Suhre | ..................... | B60N 2/879 |
| 10,829,019 B2* | 11/2020 | Dexter | ................... | B60N 2/643 |
| 10,843,803 B2* | 11/2020 | Khechine | .............. | B60N 2/885 |
| 2004/0007910 A1* | 1/2004 | Skelly | .................... | B64D 11/06 |
| | | | | 297/284.3 |
| 2017/0224117 A1* | 8/2017 | DuFresne | ................ | A47C 7/38 |
| 2019/0168880 A1* | 6/2019 | Khechine | ........... | B64D 11/0642 |

OTHER PUBLICATIONS

Written Opinion of the International Searching Authority, issued in PCT/TR2020/050024, dated Aug. 21, 2020.

* cited by examiner

ANGLE MECHANISM PASSENGER SEAT SLEEPING PILLOW

TECHNICAL FIELD

The invention relates to an anatomical, angular-mechanism passenger seat sleeping pillow designed to meet the sleeping needs of people in the healthiest way while traveling by aircraft, buses, trains.

STATE OF THE ART

In the current situation, all the travel tools we examine around us; airplane, bus, train, midibus etc. all have seats designed for the comfort and safety of passengers.

Some of these seats have head restraints and some have neck restraints. But none of them would give satisfactory results; It is not widely used in passenger transportation sector where competition and customer satisfaction are indispensable.

Although we found some sources in our researches, we found that not all of them were designed according to passenger use and anatomical structure or that the adaptation to anatomical structure was not satisfactory. A few examples can be given to these designs are; 2018/02795 "Passenger Pillow", 2016/00955 "U Shaped Headrest", 2006/01403 "A recumbent support for the comfort of people sitting in transport vehicles and household seats", 2016/18987 "Headrest".

AIM OF THE INVENTION

The passenger seat sleeping pillow with angular mechanism, which eliminates all of the above-mentioned inventions and incorporates many innovations, satisfies all the requirements that are sought in terms of comfort during the journey.

Thanks to the present invention, long distance journeys will now be more comfortable and healthier. It will help in eliminating the attention deficiencies caused by people's neck stiffness and excessive insomnia during the journey.

In order that the full description of the invention and its operating principle be understood, the figures and reference numerals which will be referred to in the description are described below.

EXPLANATION OF FIGURES

FIG. 16: Angle mechanism

DESCRIPTION OF REFERENCES IN THE FIGURES

Figure 1:
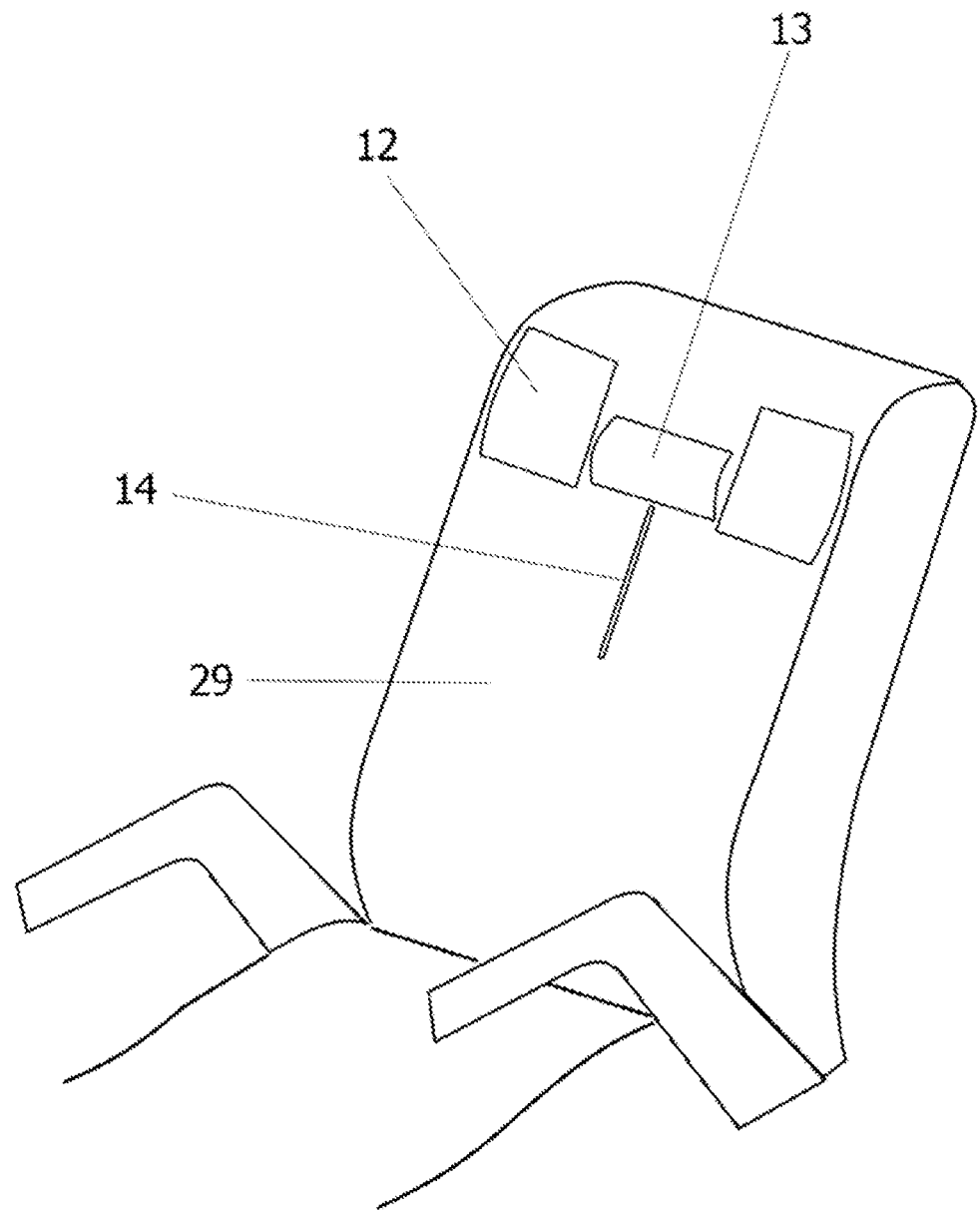
FIG. 1: Front perspective on the closed position of angle mechanism of passenger seat sleep pillow front-operated

A: Angle mechanism passenger seat sleeping pillow front-operated.
B: Angle mechanism passenger seat sleeping pillow front-operated mechanism whole.
C: Angle mechanism passenger seat sleeping pillow side-operated.
D: Angle mechanism passenger seat sleeping pillow side-operated mechanism whole.
E: Angle mechanism passenger seat sleep pillow motorized system.
1: Angle mechanism
1a: Angle mechanism handle
2: Pillow mounting tray
3: Pillow angle spring
4: Angle mechanism or bracket pillow connector
5: Angle-stepped turning head
6: Main body rod
7: Adjustment bar mounting tray
8: Adjustment bar mounting holes
9: Pillow mounting tray screw holes
10: Side-operated pillow bracket
10a: Side-operated elbow spring
11: Pillow turning wheel
12: Headrest Pillow (right-left)
   12.1: Pillow angle movement position 1
   12.2: Pillow angle movement position 2
   12.3: Pillow angle movement position 3
   12.4: Pillow angle movement position 4
   12.5: Pillow angle movement position 5
   12.6: Pillow angle movement position 6
   12a: Pillow holder
13: Neck pillow
   13.1: Neck pillow adjustment 1
   13.2: Neck pillow adjustment 2
14: Adjustment rod bearing on seat
15: Side mount pillow arm bearing
16: Side mount pillow holder 17: Adjustment bar tray
17a: Adjustment rod screw holes
18: Connecting rod connecting rod
19: Adjustment rod opening spring
20: Adjustment bar retaining ring
21: Adjustment bar lever
22: Angle mechanism lock slot
23: Angle mechanism lock
24: Angle spring mechanism
25: Angle gear mechanism
26: Angle mechanism center mounting shaft
27: Adjustment bar
28: Angle mechanism lock spring
29: Passenger Seat
30: Neck pillow mounting tray
31: Neck pillow holder
32: Angle mechanism spring holder
33: Pillow wheel pin
34: Pillow wheel pin spring
35: Pillow wheel coupling hole
36: Pillow wheel pin locking bearing
37: Pillow wheel mounting tray screw hole
38: Separator ring
39: Lock lever wheel
40: Lock lever wheel spring
41: Pillow angle motors
42: Adjustment bar up and down motor
43: Control panel
44: Adjustment bar guide
45: Worm gear

DETAILED DESCRIPTION OF THE INVENTION

Figure 4:
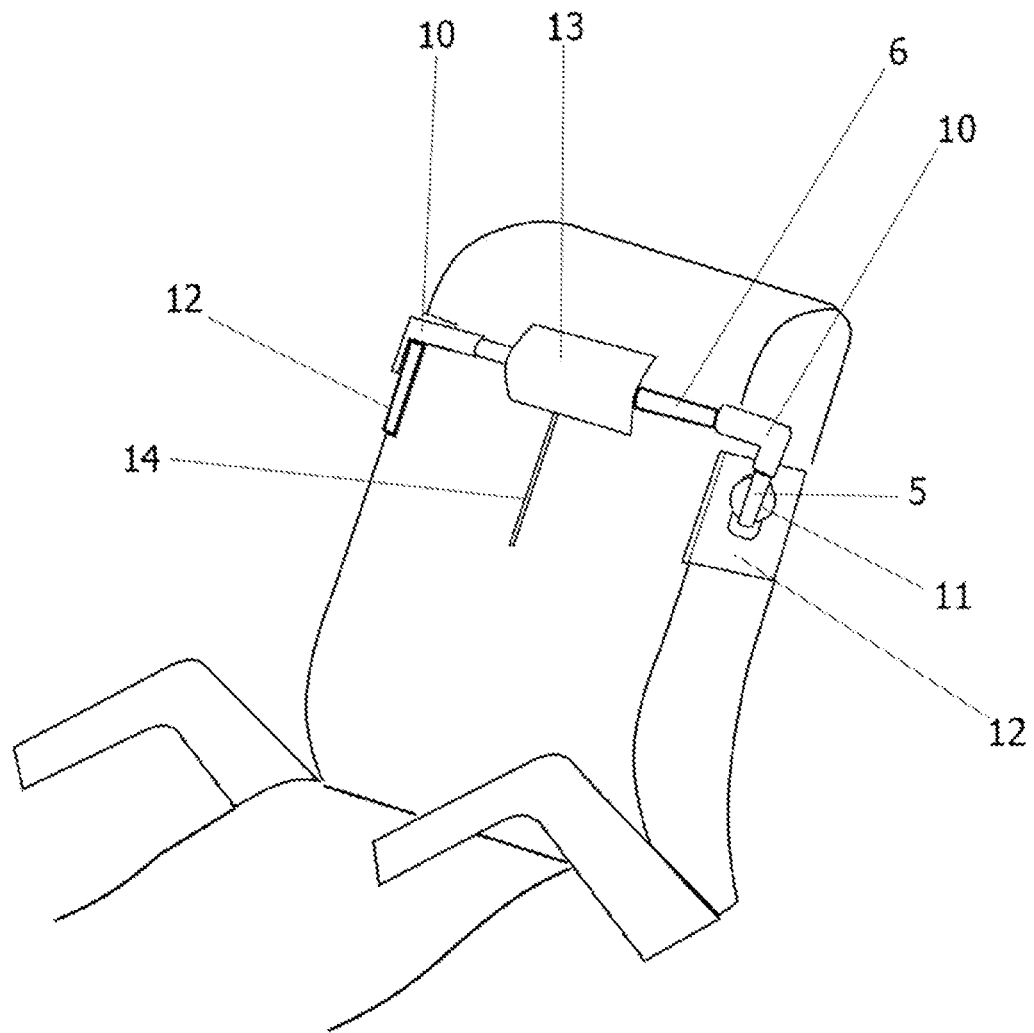
FIG. 4: Front perspective on the closed position of angle mechanism of passenger seat sleep pillow side-operated

The invention provides innovation both by itself and by its angle mechanism. The passenger seat sleeping pillow with angle mechanism can be installed in the seats either post-manufacturing or in the manufacturing stage, with the advantage of mounting two types (FIG. 1) or (FIG. 4), two types of head pillow (right-left) (12) operation (FIG. 1) or (FIG. 4). For this reason, two types of working methods; the angular-motion passenger seat sleep pillow front-operated (A) (FIG. 1) and the angular-mechanism passenger seat sleep pillow side-operated (C) (FIG. 4) shall be described separately.

Figure 2:
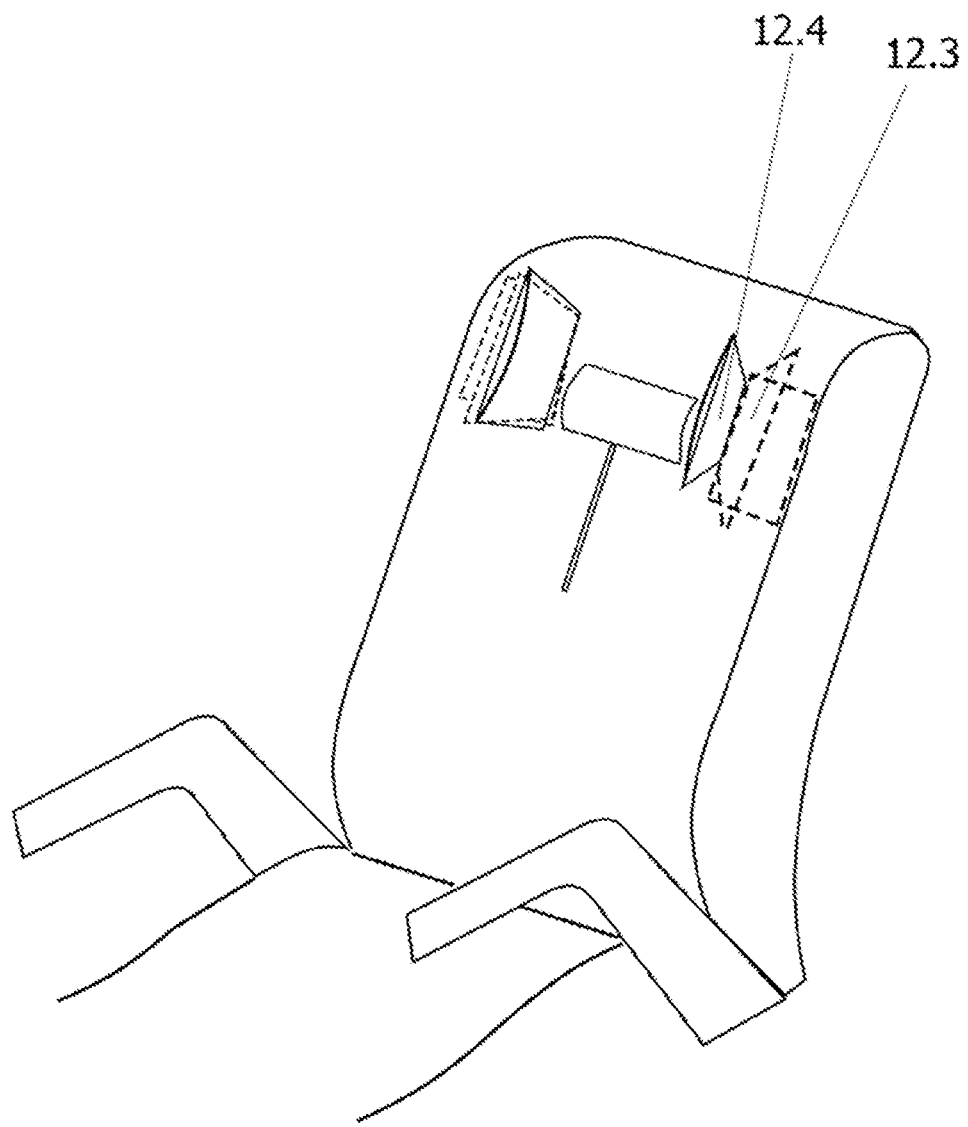
FIG. 2: Front perspective on the closed position of angle mechanism of passenger seat sleep pillow front-operated

Angle mechanism passenger seat sleep pillow front-operated (A) (FIG. 1); Angle mechanism (1) and angle mechanism arm (la) are added to the main body rod (6) so that the head restraints (right-left) (12) at both ends can rotate at different angles towards the front of the seat (FIG. 2).

Angle Mechanism (1); Angle mechanism lever (la), angle mechanism lock housing (22), angle mechanism lock (23), angle mechanism spring (24), angle mechanism gear (25), angle mechanism central mounting shaft (26), angle mechanism lock spring (28) and angle mechanism spring retainer (32) separating ring (38), lock lever wheel (39), lock lever wheel spring (40) is formed. Angle mechanism (1) provides the head restraint pillow (right-left) (12) is positioned at different angles (12.3) (12.4) as seen in FIG. 2, and it allows opening at different angles forward.

Figure 3:
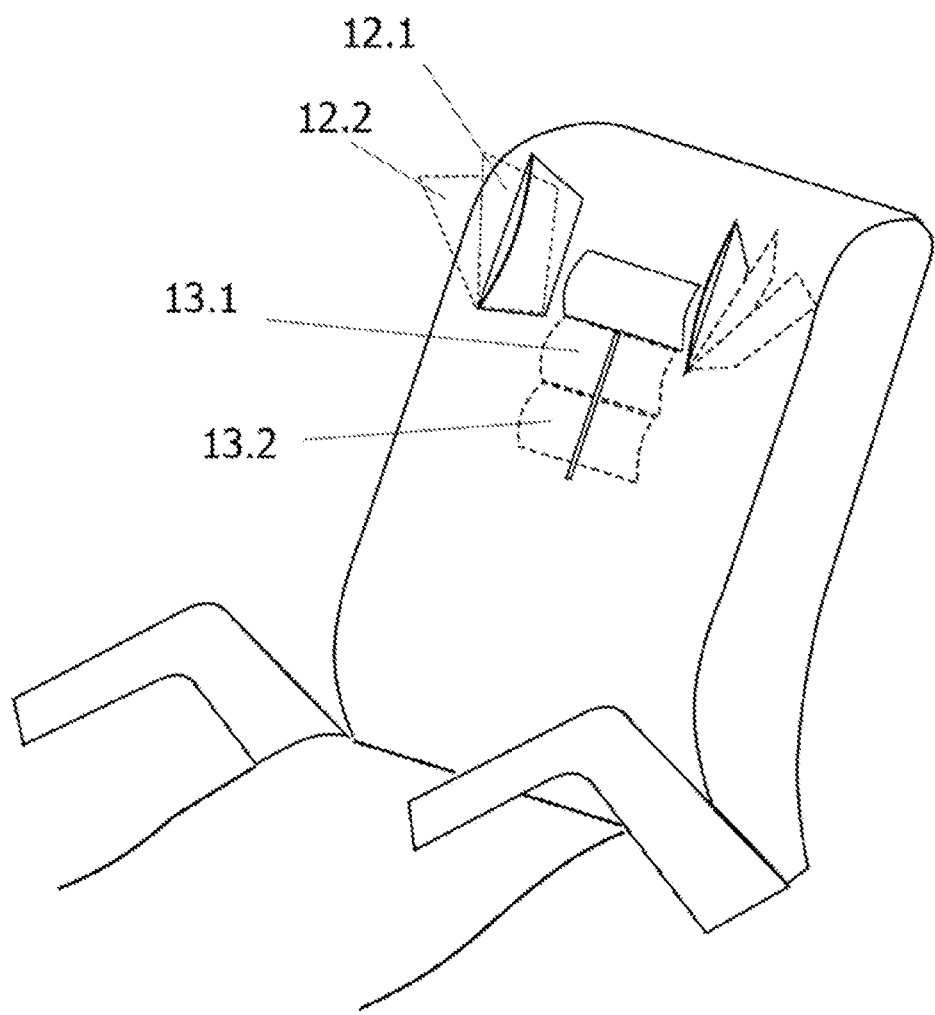
FIG. 3: Front perspective on the angled position of angle mechanism of passenger seat sleep pillow front-operated

The angle mechanism arm (1a) is connected to the angle mechanism pillow connection part (4), and the angle step is connected to the rotating head (5) and the pillow angle spring (3). The angle-stepped turning head (5) and the pillow angle spring (3) provide the pillow (12) with an outward angle, such as (12.1) and (12.2) in angular operation (FIG. 3). The pillow angle spring (3) also allows the headrest pillow (right-left) (12) to return back again. The angle-stepped rotating head (5) and the pillow mounting tray (2) are combined, and the pillow mounting tray screw holes (9) and the pillow holder (12a) and the headrest pillow (right-left) (12) are added to each other. The neck pillow (13) is connected to the main body rod (6) by the neck pillow mounting tray (30) and the neck pillow holder (31). The passenger seat sleeping pillow with the angular mechanism is front-operated (FIG. 1), the main body rod (6) and the adjustment rod (27) are connected for the upward and downward movement of the seat (13.1) (13.2) in the seat (29). This coupling is provided by the adjustment bar tray (17) and the adjustment bar screw holes (17a) in the adjustment bar (27) by means of the adjustment bar mounting tray (7) and the adjustment bar mounting holes (8). The angular mechanism passenger seat sleeping pillow is moved up and down in the adjustment rod bearing (14) in the seat on the seat (29).

The adjusting rod (27); adjustment bar tray (17), adjustment bar connecting arm (18), adjustment bar opening spring (19), adjustment bar holding ring (20), adjustment bar arm (21) is formed. The adjustment rod (27) assembly is mounted on the seats during the seat manufacturing stage.

Figure 5:
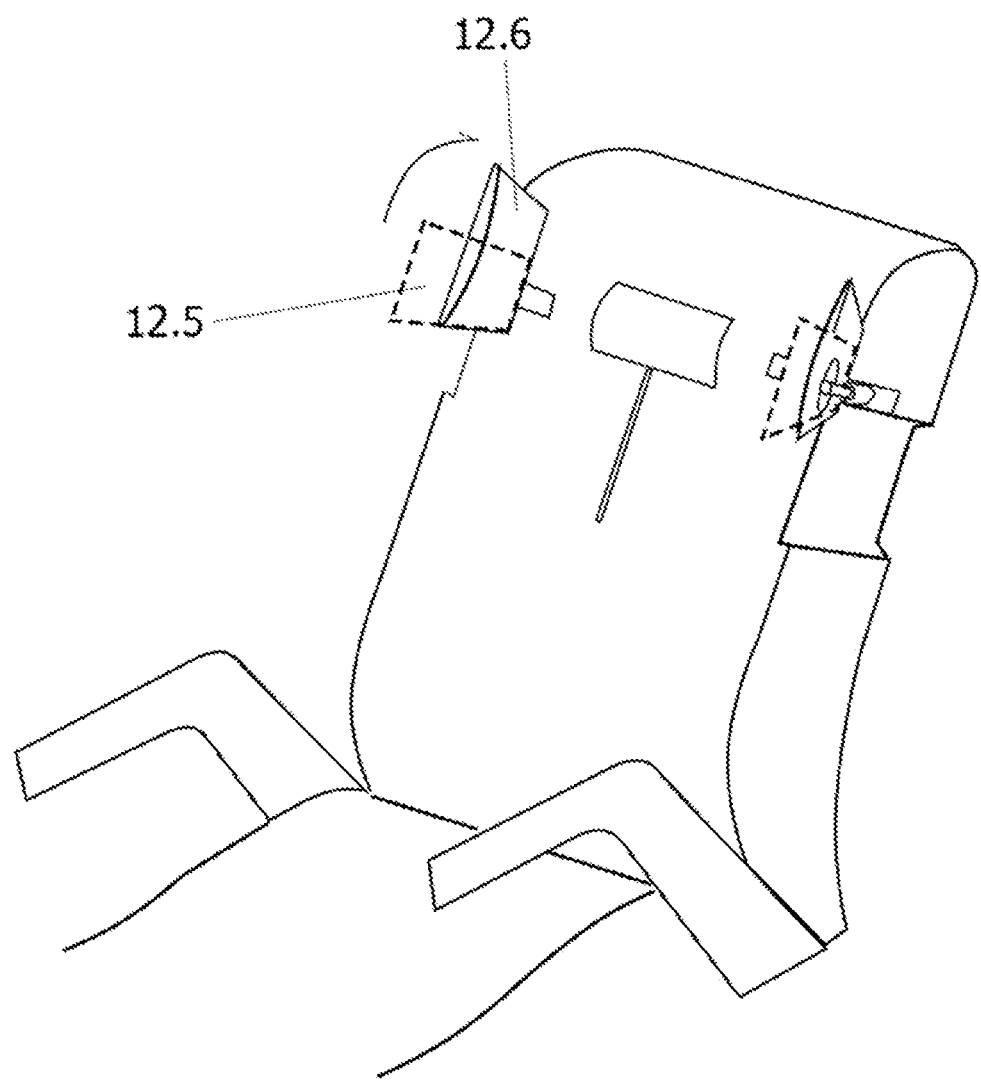
FIG. 5: Front perspective on the semi-opened position of angle mechanism of passenger seat sleep pillow side-operated
Figure 7:
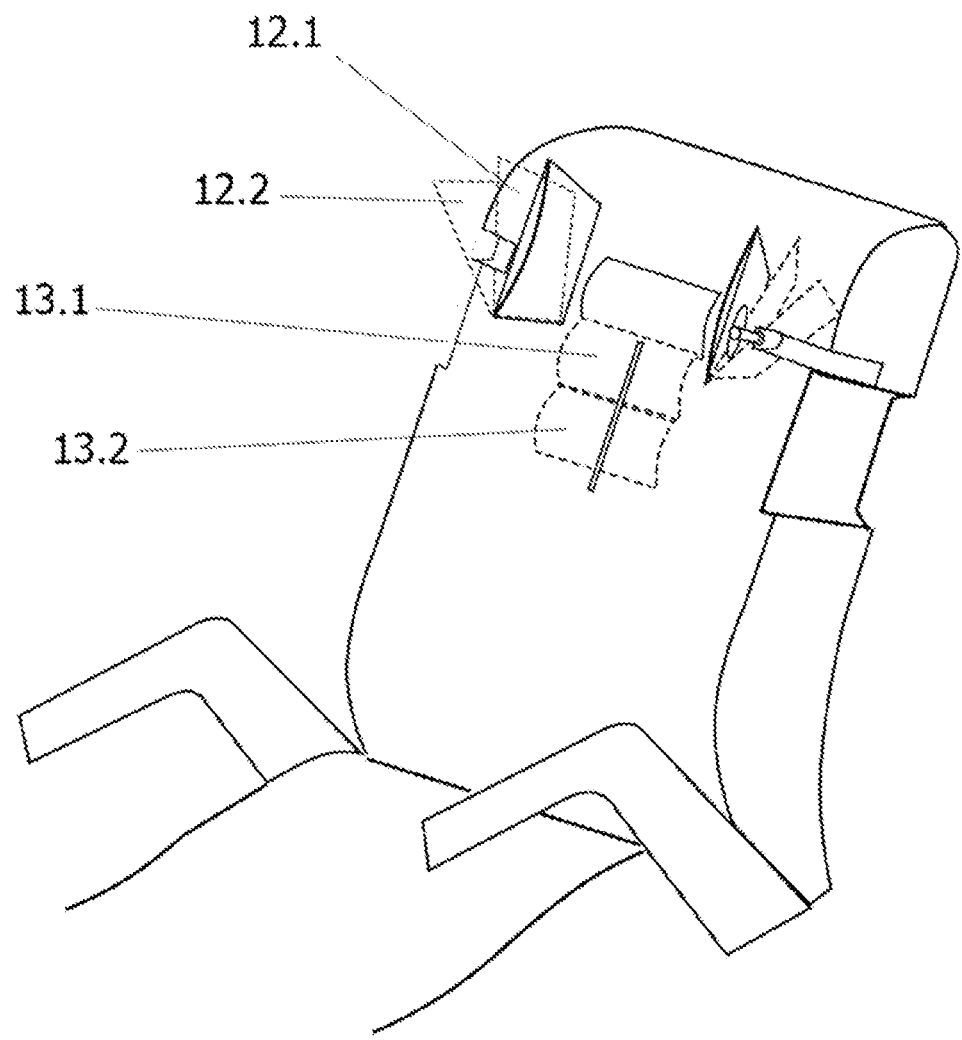
FIG. 7: Front perspective on the angled position of angle mechanism of passenger seat sleep pillow side-operated
Figure 8:
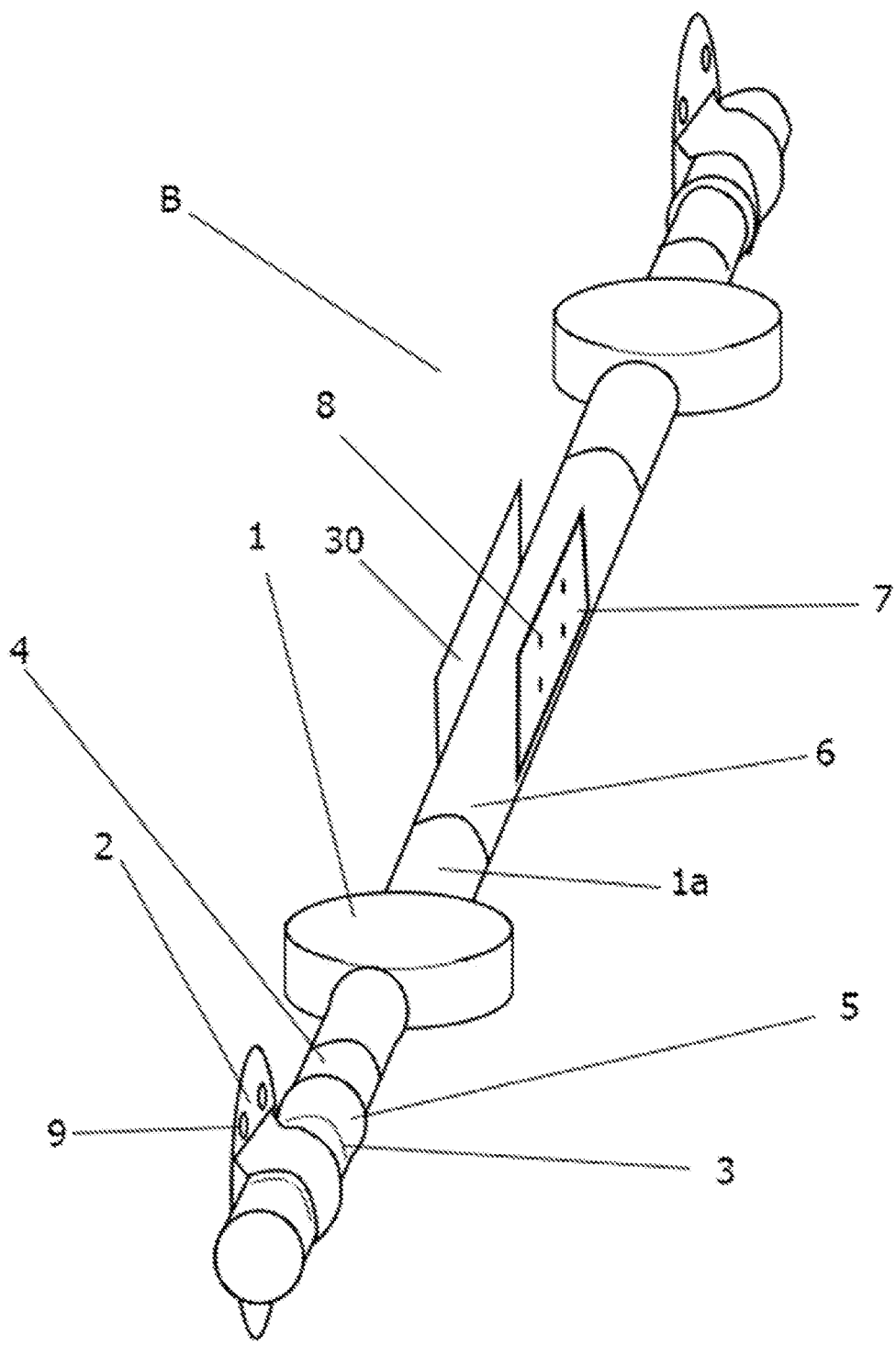
FIG. 8: Perspective view of angle mechanism passenger seat sleeping pillow front-operated, whole mechanism (B) closed
Figure 9:
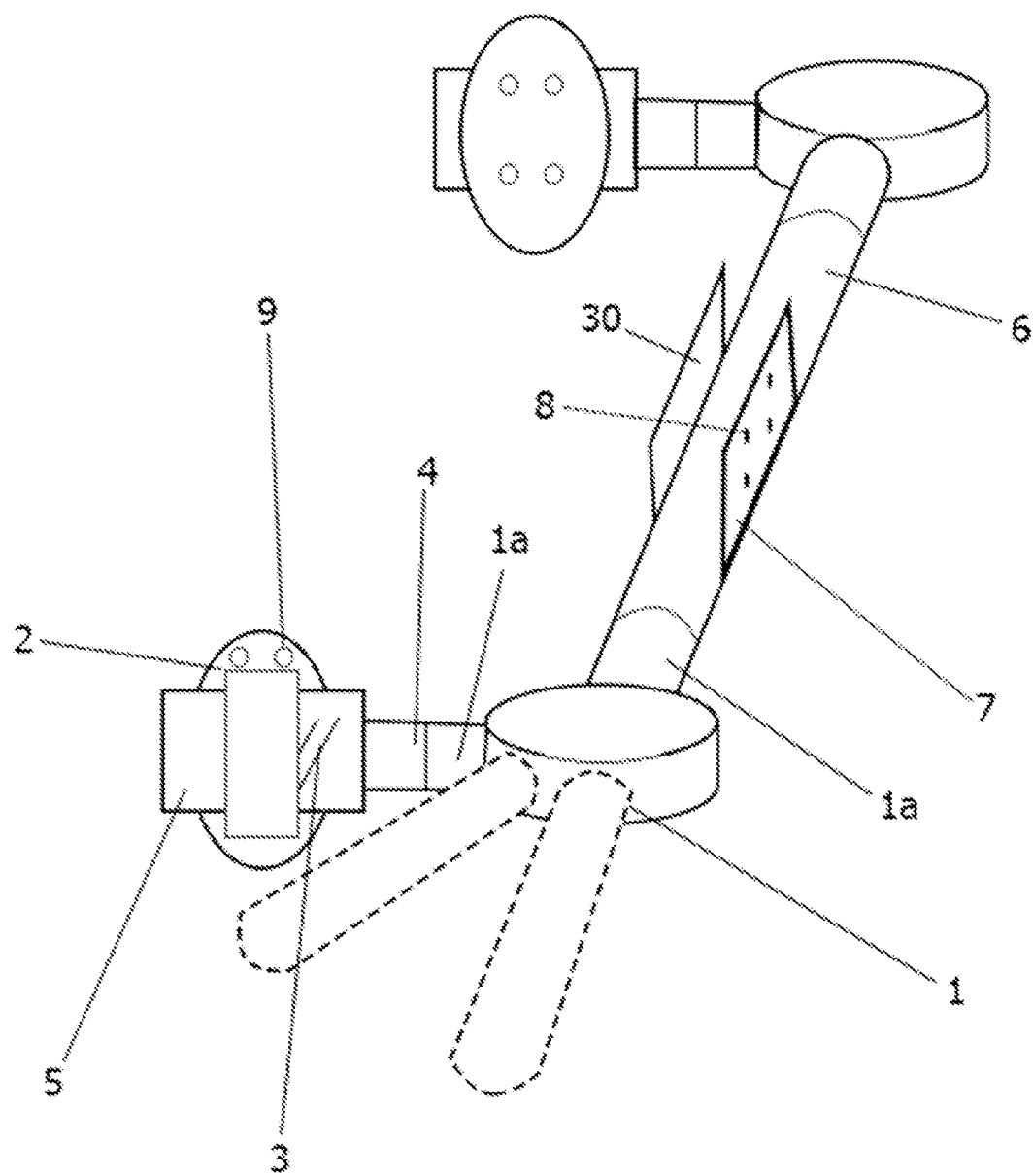
FIG. 9: Perspective view of angle mechanism passenger seat sleeping pillow front-operated, whole mechanism (B) open at different angles
Figure 10:
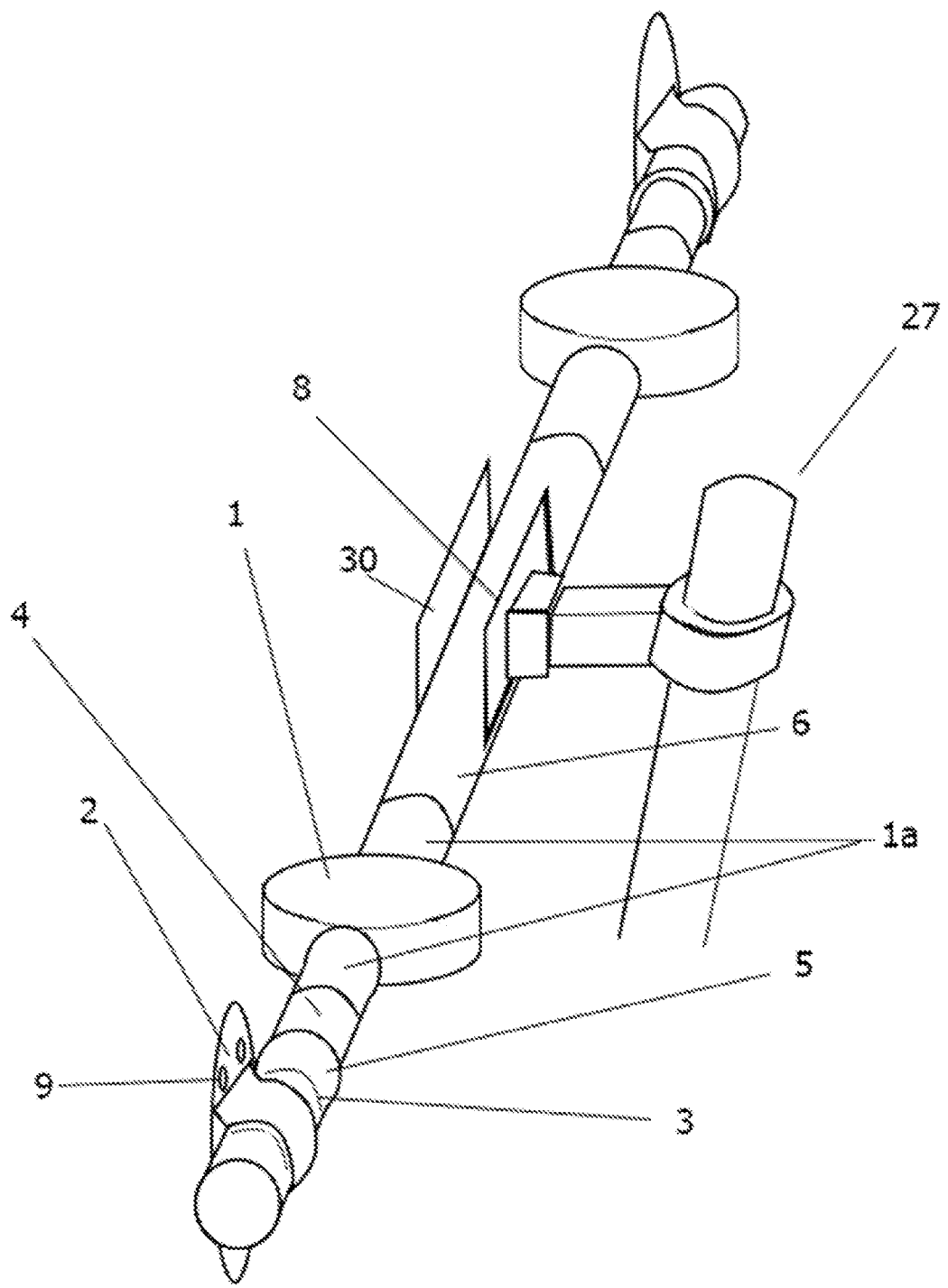
FIG. 10: Perspective view of angle mechanism passenger seat sleep pillow front-operated, mechanism and adjustment rod
Figure 11:
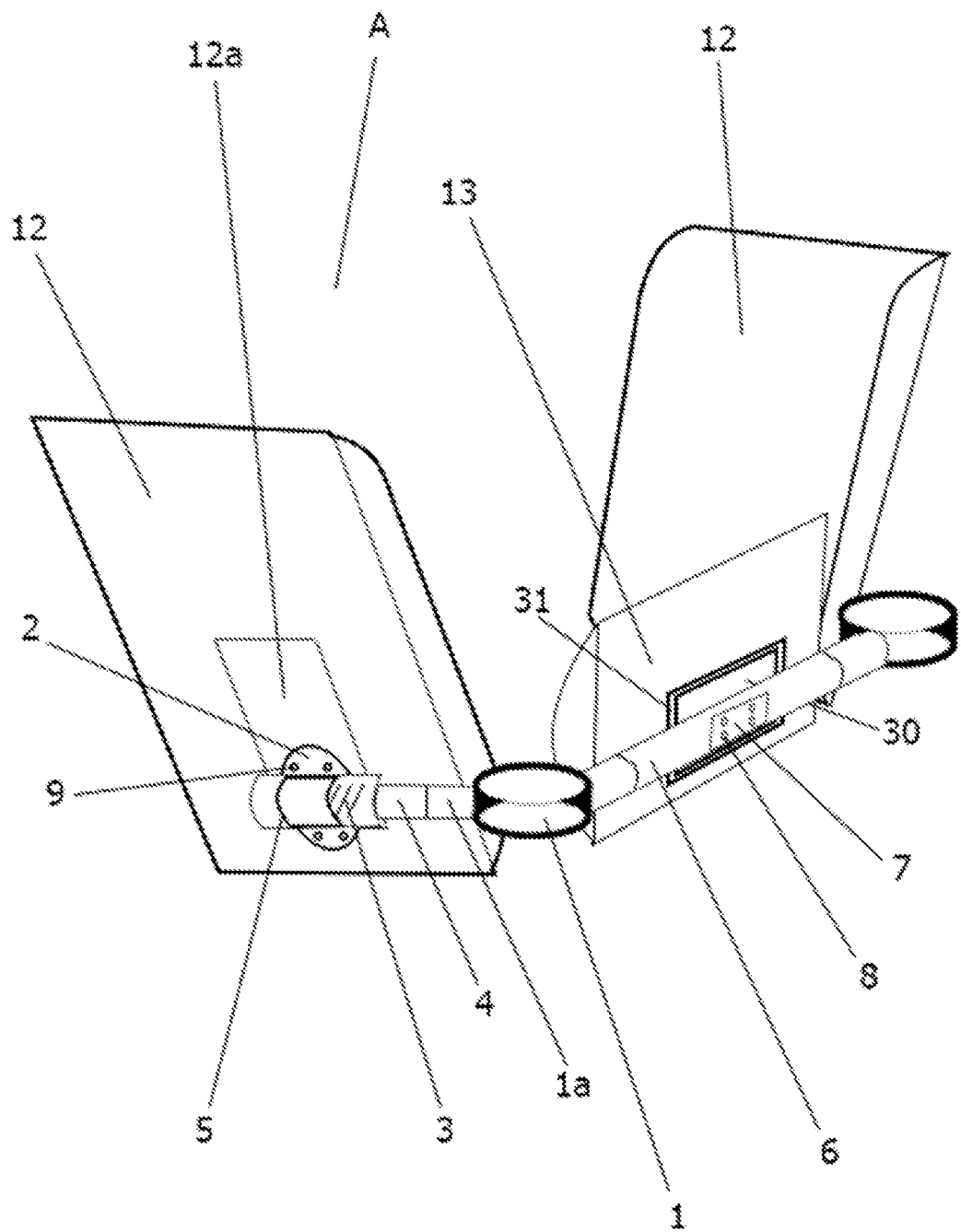
FIG. 11: Perspective view of angle mechanism passenger seat sleep pillow front-operated, all mechanism pillowed
Figure 12:
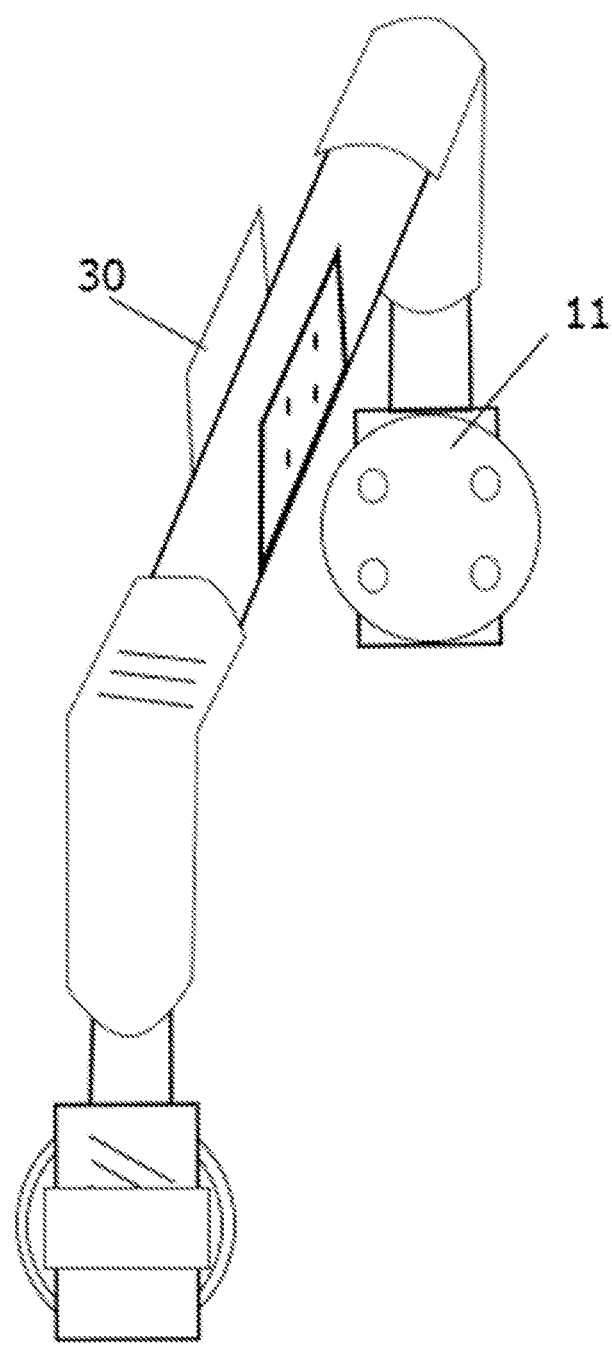
FIG. 12: Perspective view of angle mechanism passenger seat sleeping pillow side-operated mechanism, closed position
Figure 13:
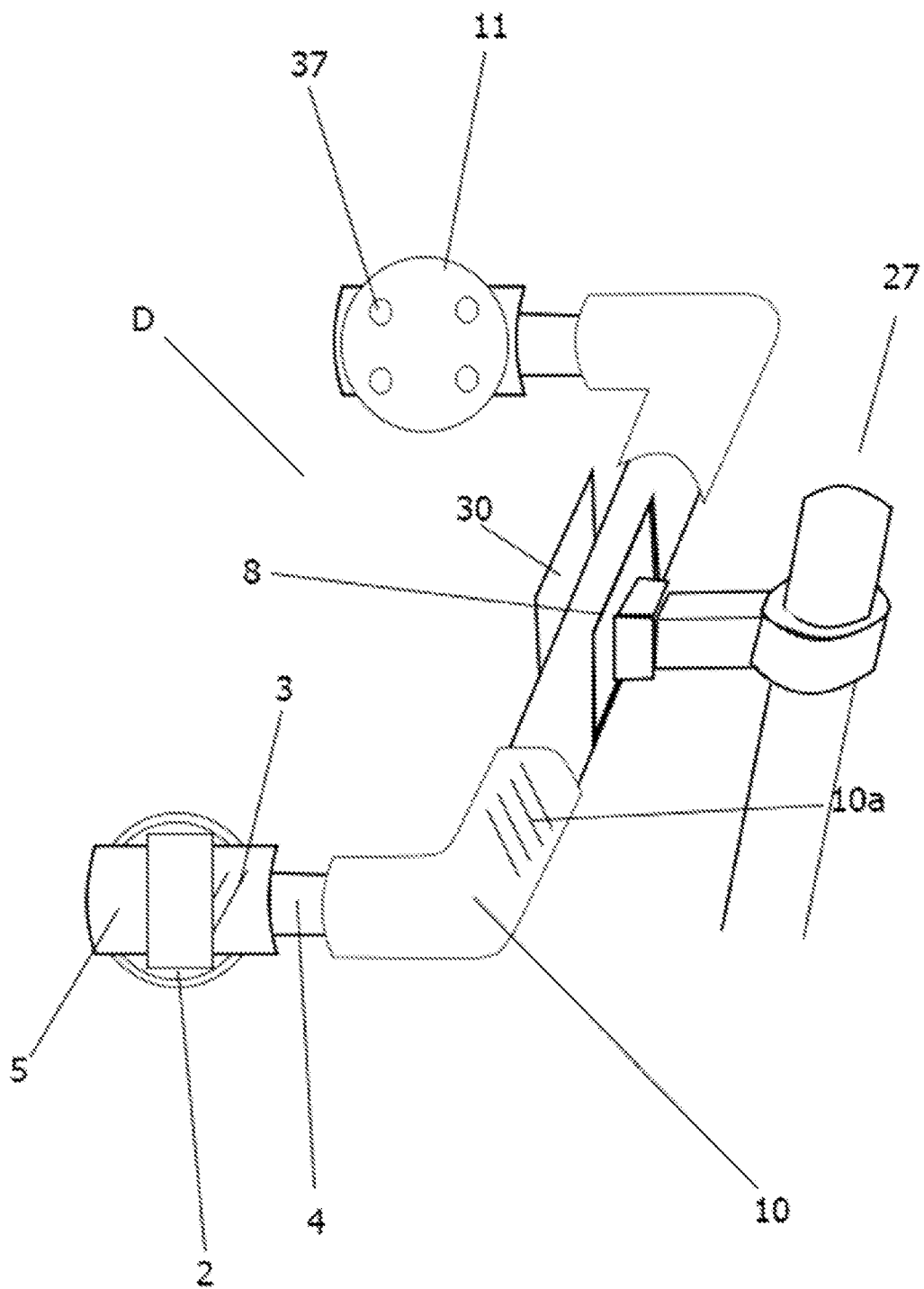
FIG. 13: Perspective view of angle mechanism passenger seat sleeping pillow side-operated mechanism, open position
Figure 14:
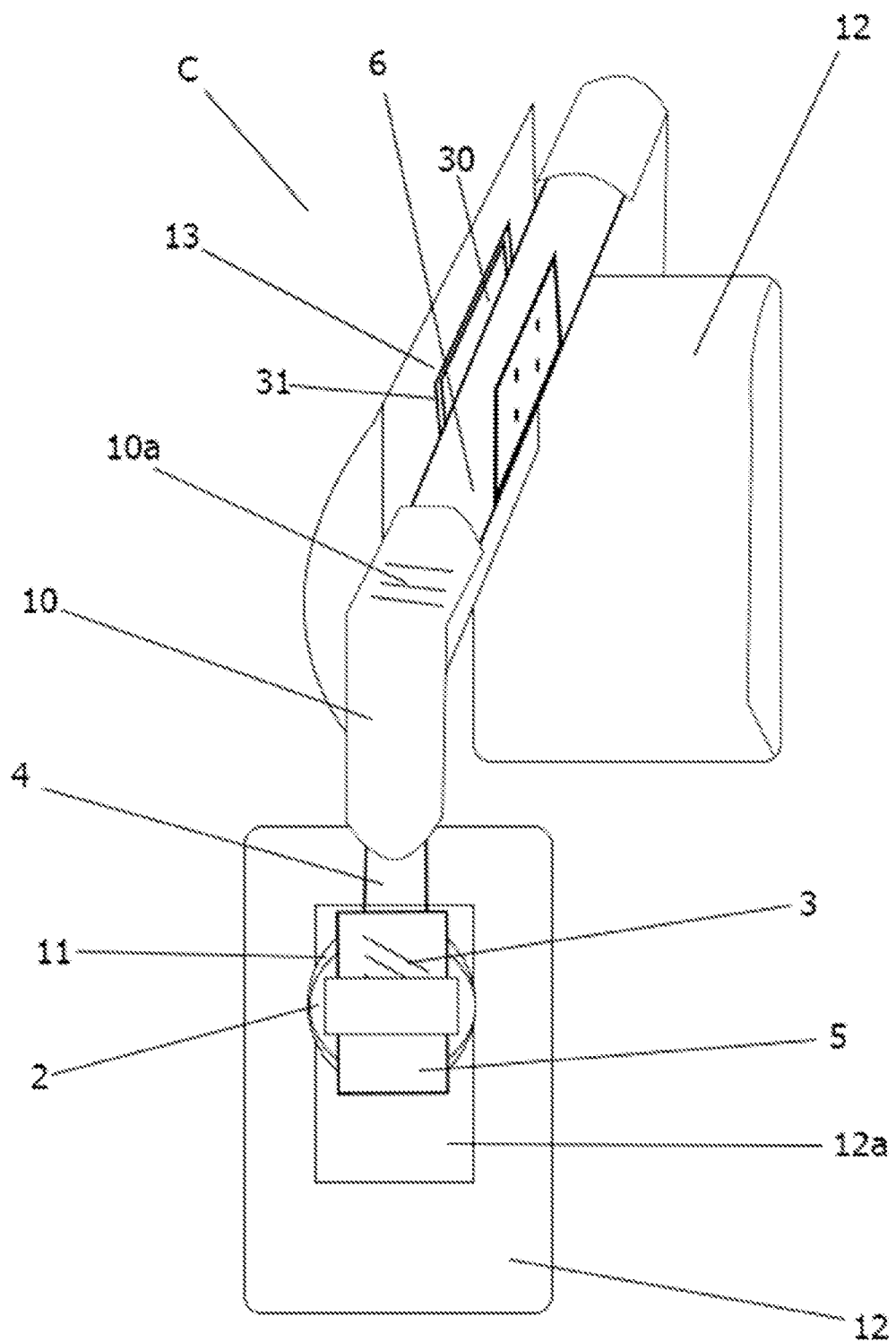
FIG. 14: Perspective view of angle mechanism passenger seat sleeping pillow side-operated mechanism, pillow closed position
Figure 15:
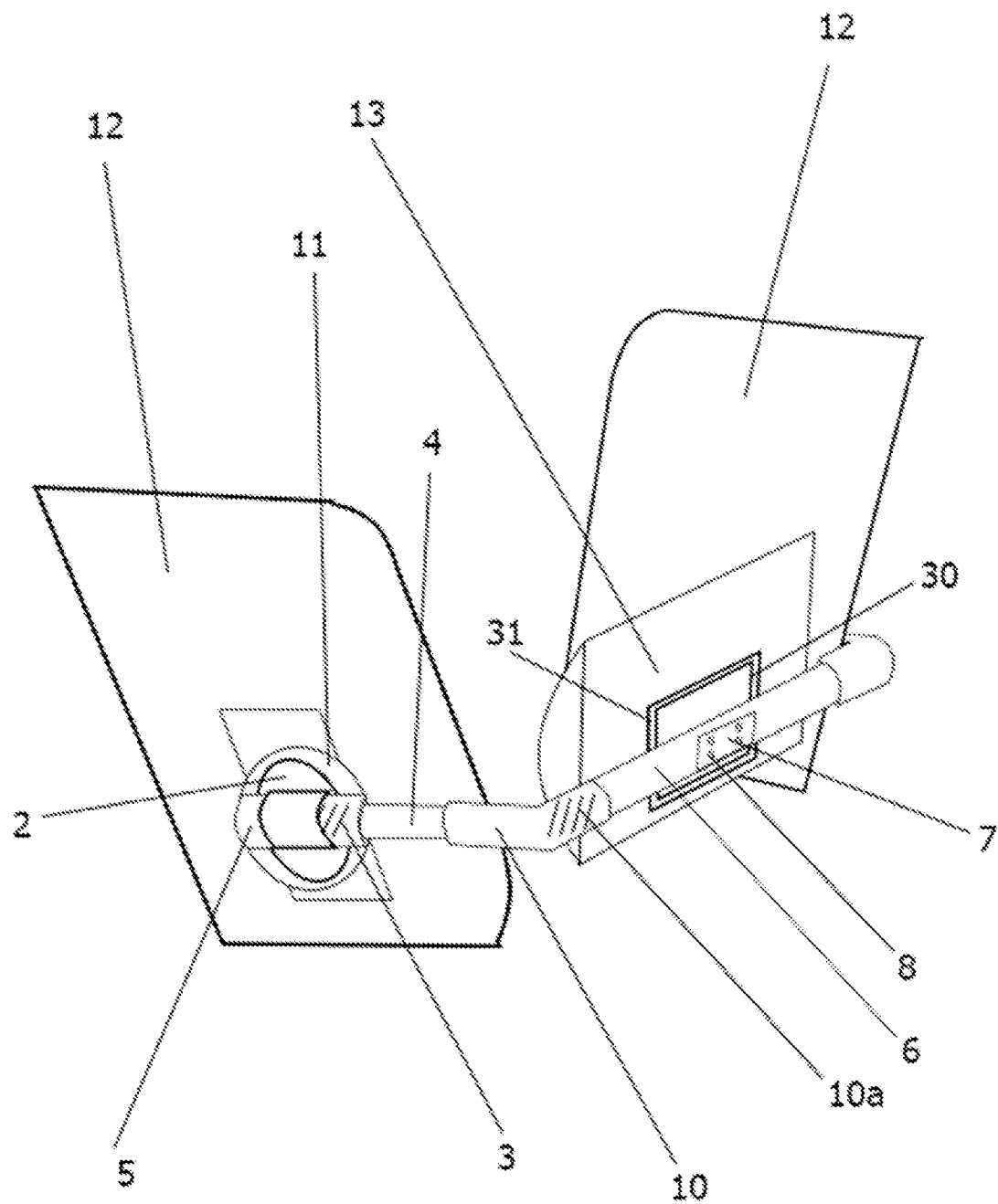
FIG. 15: Perspective view of angle mechanism passenger seat sleeping pillow side-operated mechanism, pillow open position
Figure 16A:
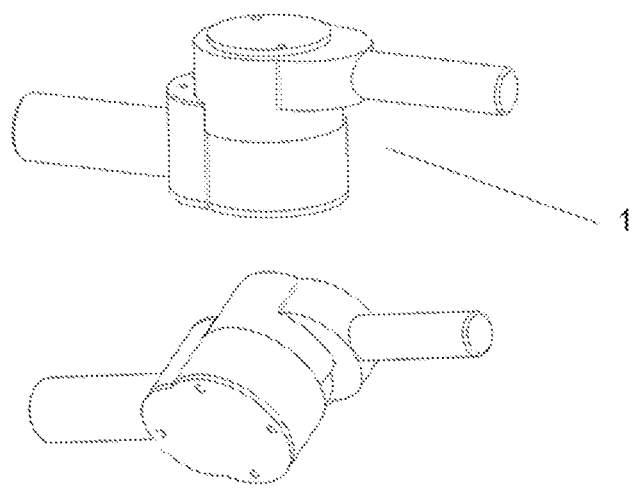
FIG. 16a: Angle mechanism bulk parts perspective 1
Figure 16B:
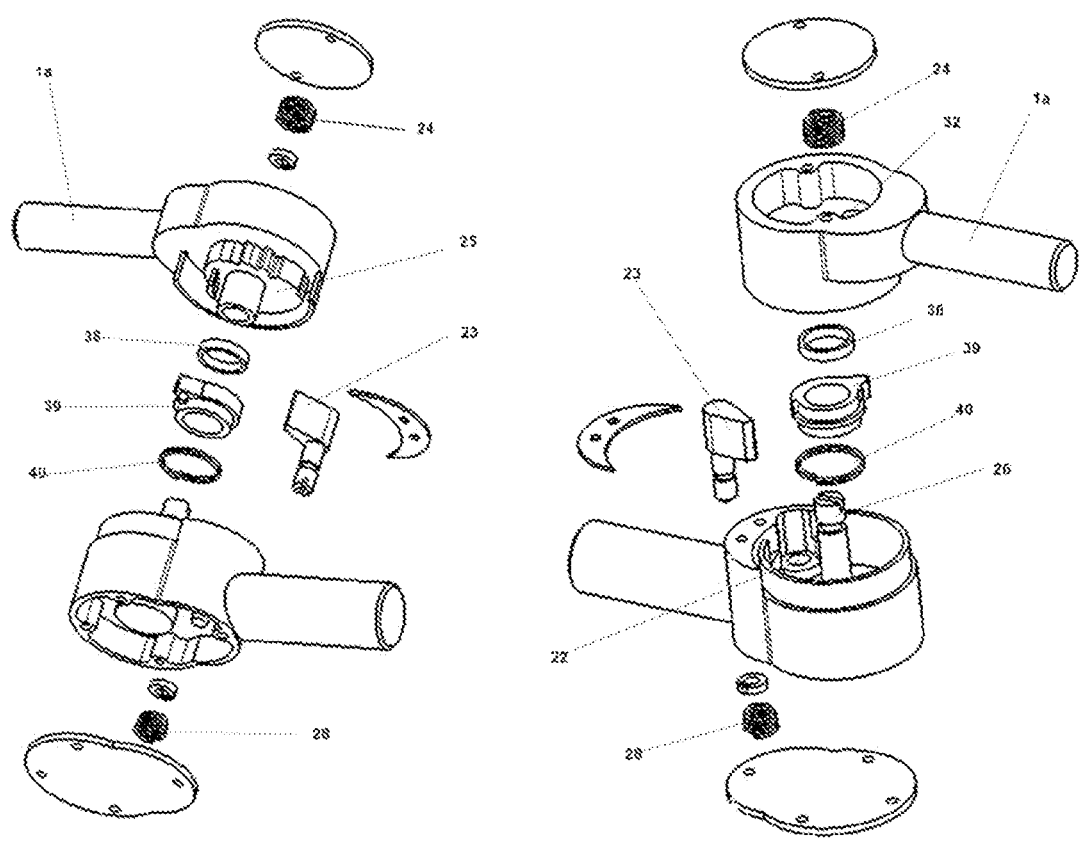
FIG. 16b: Angle mechanism bulk parts perspective 2
Figure 17:
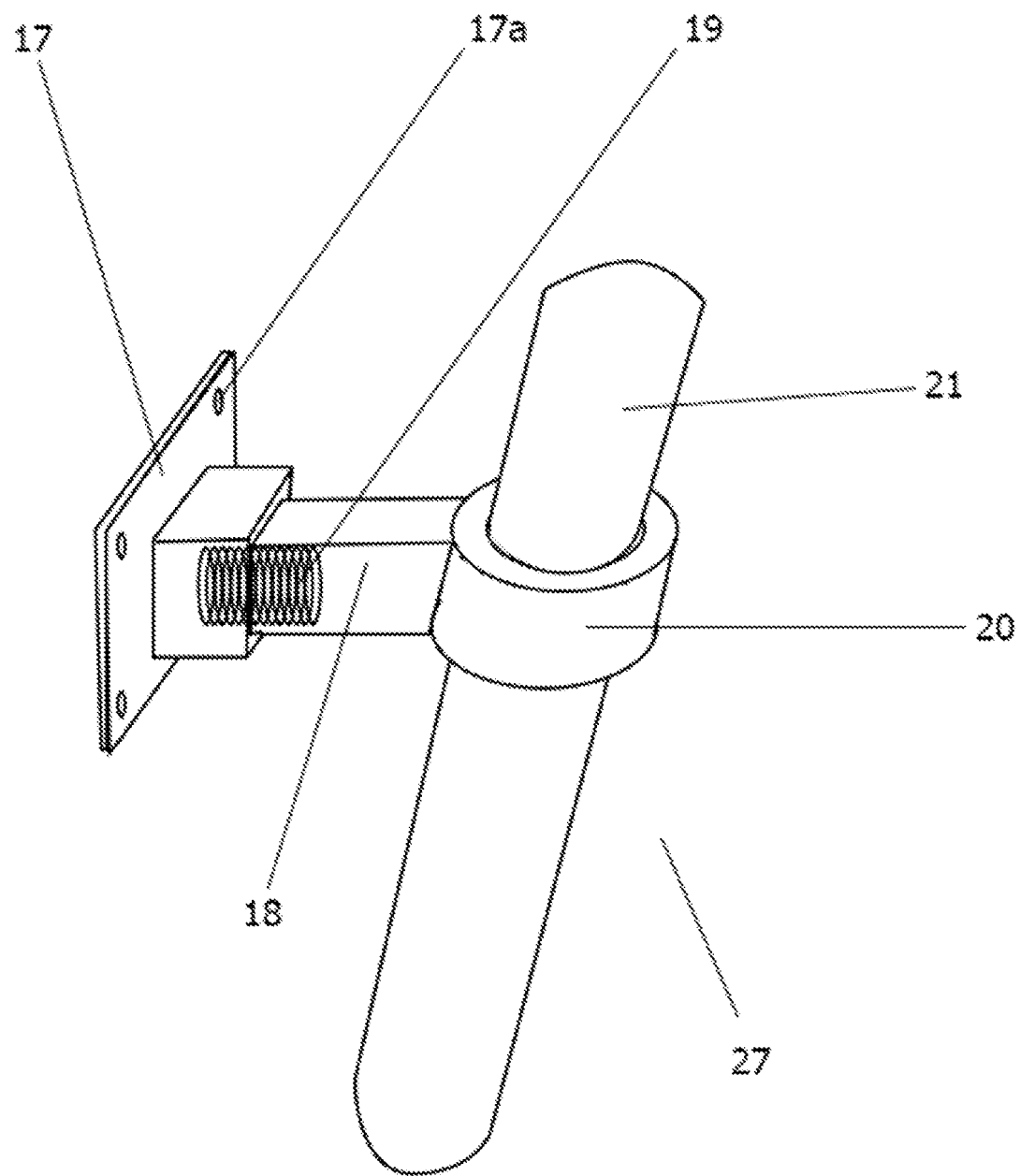
FIG. 17: Adjustment bar
Figure 18:
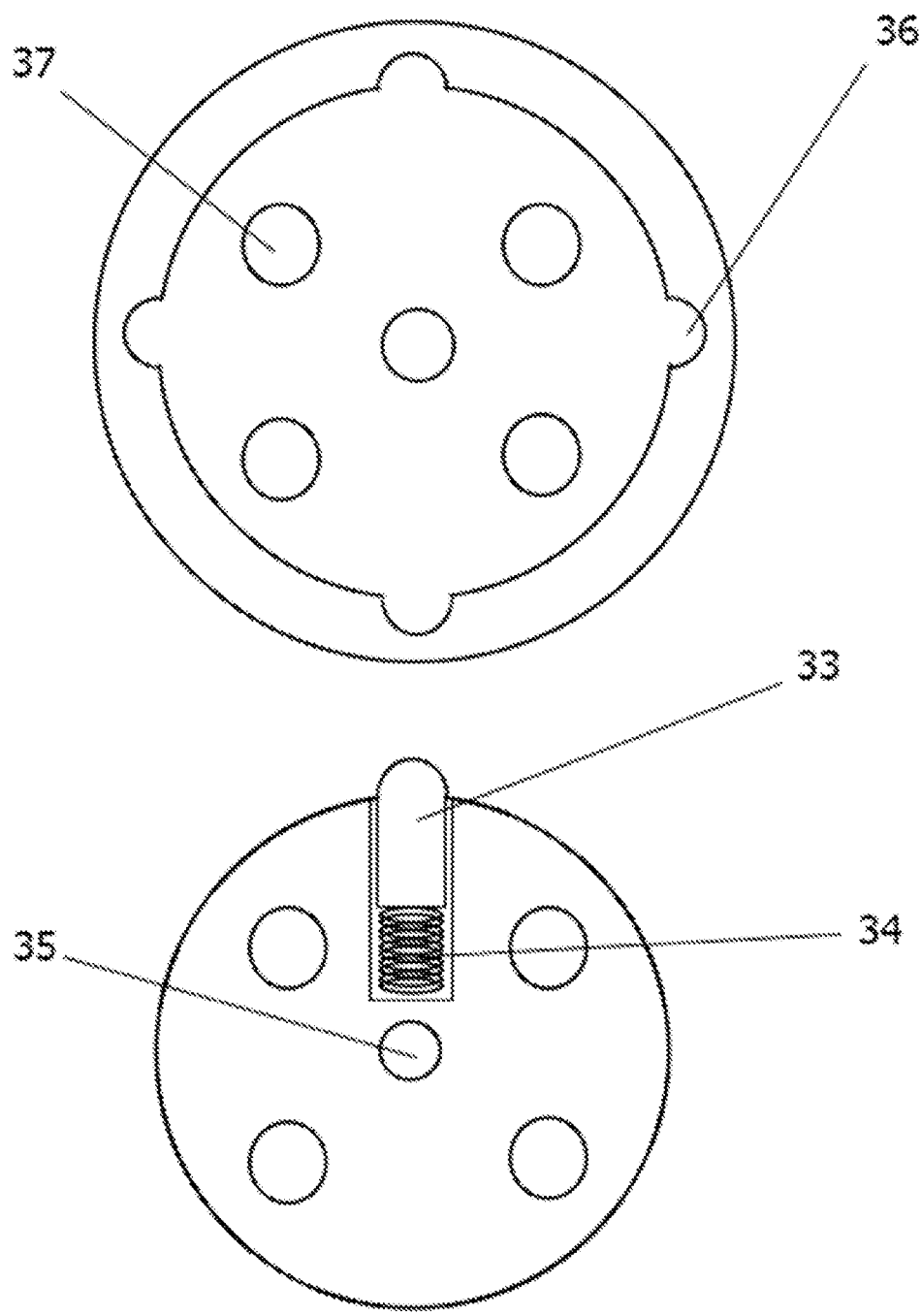
FIG. 18: Pillow rotating wheel

The passenger seat sleep pillow with an open mechanism must operate from the side (FIG. 4); the side-running pillow bracket spring (10a) and the side-running pillow bracket (10) are attached to the main body rod (6) so that the head restraints (right-left) (12) at both ends can rotate towards the front of the seat (29). Here, the side-operated pillow elbow spring (10a) allows the elbow 10 to be pulled through the side mounting pillow arm bearing (15) into the neck pillow (13). The side-operated pillow elbow (10) is connected with the angle mechanism and the elbow pillow connection part (4) and is connected to the angle-stepped turning head (5) and the pillow angle spring (3). The angle-stepped turning head (5) and the pillow angle spring (3) provide an outward angle to the pillow (12) as in (12.1) and (12.2) for angled operation (FIG. 7). The pillow angle spring (3) also allows the headrest pillow (right-left) (12) to return again. By combining the angle-stepped rotating head (5) and the pillow mounting tray (2), the screw holes (9) of the pillow mounting tray are connected with the pillow rotating wheel (11). The paddle wheel (11); The pillow pin (33), the pillow wheel pin spring (34), the pillow wheel coupling hole (35), the pillow wheel pin locking bearing (36), and the pillow wheel mounting tray screw hole (37). The pillow (12) is rotated about its axis (FIG. 5); The pillow angle movement position 5 (12.5) provides the ability to rotate the pillow angle movement position 6 (12.6). The paddle wheel 11 is attached to the headrest pillow (12) via the pillow holder (12a). The neck pillow (13) is connected to the main body rod (6) by the neck pillow mounting tray (30) and the neck pillow holder (31). At the passenger seat sleeping pillow with the angular mechanism side-operated (C) given in FIG. 4, the main body rod (6) and the adjusting rod (27) are coupled to the seat (29) up and down movement as shown in FIG. 7 (13.1), (13.2). This coupling is provided by the adjustment bar tray (17) and the adjustment bar screw holes (17a) in the adjustment bar (27) by means of the adjustment bar mounting tray (7) and the adjustment bar mounting holes (8).

As a result of the combination of the parts, the headrest pillow (12) is approached to the neck pillow (13) in both uses (FIG. 1) or (FIG. 4), and the angled position of the pillow provides the passenger with comfort supported by the neck and cheek. By means of the adjustment rod (27), preferred usage is provided according to the height of the passenger.

After connecting the parts of the passenger seat sleeping pillow with angle mechanism which are explained above with reference to the figures and figures, we will now try to explain the working principle of these parts again with the help of the figures.

In the embodiment of angle mechanism passenger seat sleeping pillow front-operated (A) (FIG. 1), the head pillow (right-left) (12) in the closed position (FIG. 1) is pulled forward and brought to the position (12.3) or (12.4) with the aid of the angle mechanism (1) as in FIG. 2. The head restraint pillow (right-left) 12 is then used as desired (FIG. 3) by means of an angle mechanism rotating head (5) and a pillow angle spring (3), which are angled to the position (12.1) or (12.2). If the neck pillow (13) remains upward relative to the passenger, the neck pillow (13) is pulled forward and the adjustment rod opening spring (19) is tensioned and the neck pillow (13) is removed from the seat (29). The neck pillow (13) together with the head restraints (12), such as (13.1) or (13.2) positions of the neck pillow (13) as shown in FIG. 3, allows the adjustment rod retaining ring (22) to slide downwards from the adjustment rod arm (21), which is pulled downwards.

Figure 6:
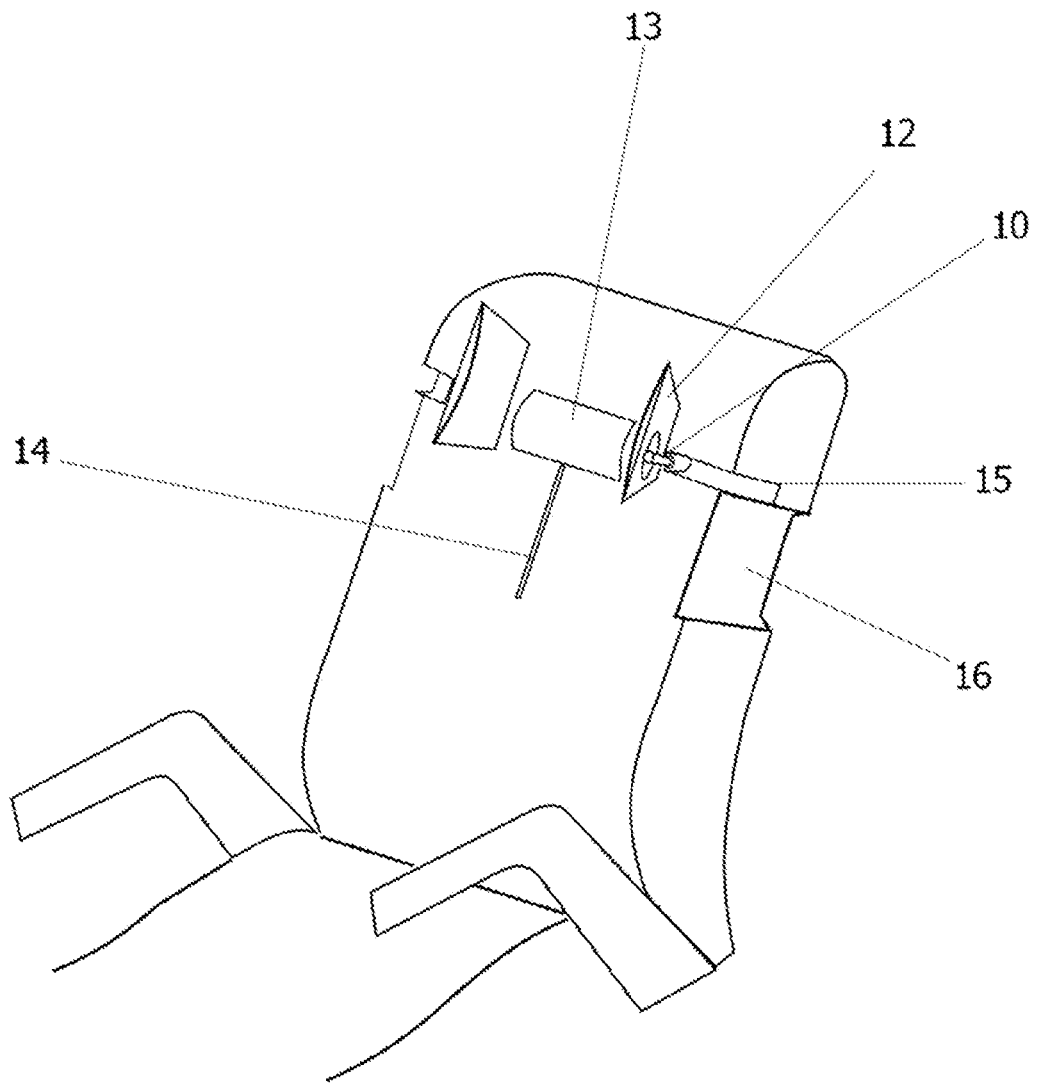
FIG. 6: Front perspective on the fully opened position of angle mechanism of passenger seat sleep pillow side-operated

In the embodiment of passenger seat sleeping pillow with angle mechanism is side-operated (C) (FIG. 4); the pillow in the closed position (FIG. 4) is pulled forward so that the headrest pillow (12) is turned upwards by means of the side-operated pillow elbow (10). The elbow (10) entering the side mounting pillow arm bearing (15) approaches the neckrest (13) with the help of the side-operated elbow spring (10*a*) as shown in FIG. 6. At this stage, the horizontal pillow (12.5) is brought to the vertical position (12.6) by means of the rotating wheel (11). The angle-stepped turning head (5) is used in any of the positions (12.1) or (12.2) as in FIG. 7. If the neck pillow (13) remains upward relative to the passenger, the neck pillow (13) is pulled forward and the adjustment rod opening spring (19) is tensioned and the neck pillow (13) is removed from the seat (29). The neck pillow (13) together with the headrest pillows (12), such as (13.1) or (13.2) of the neck pillow (13), allows the adjustment rod retaining ring (22) to slide downwards from the adjustment rod arm (21), which is pulled downwards.

INDUSTRIAL APPLICATION OF THE INVENTION

Figure 19:
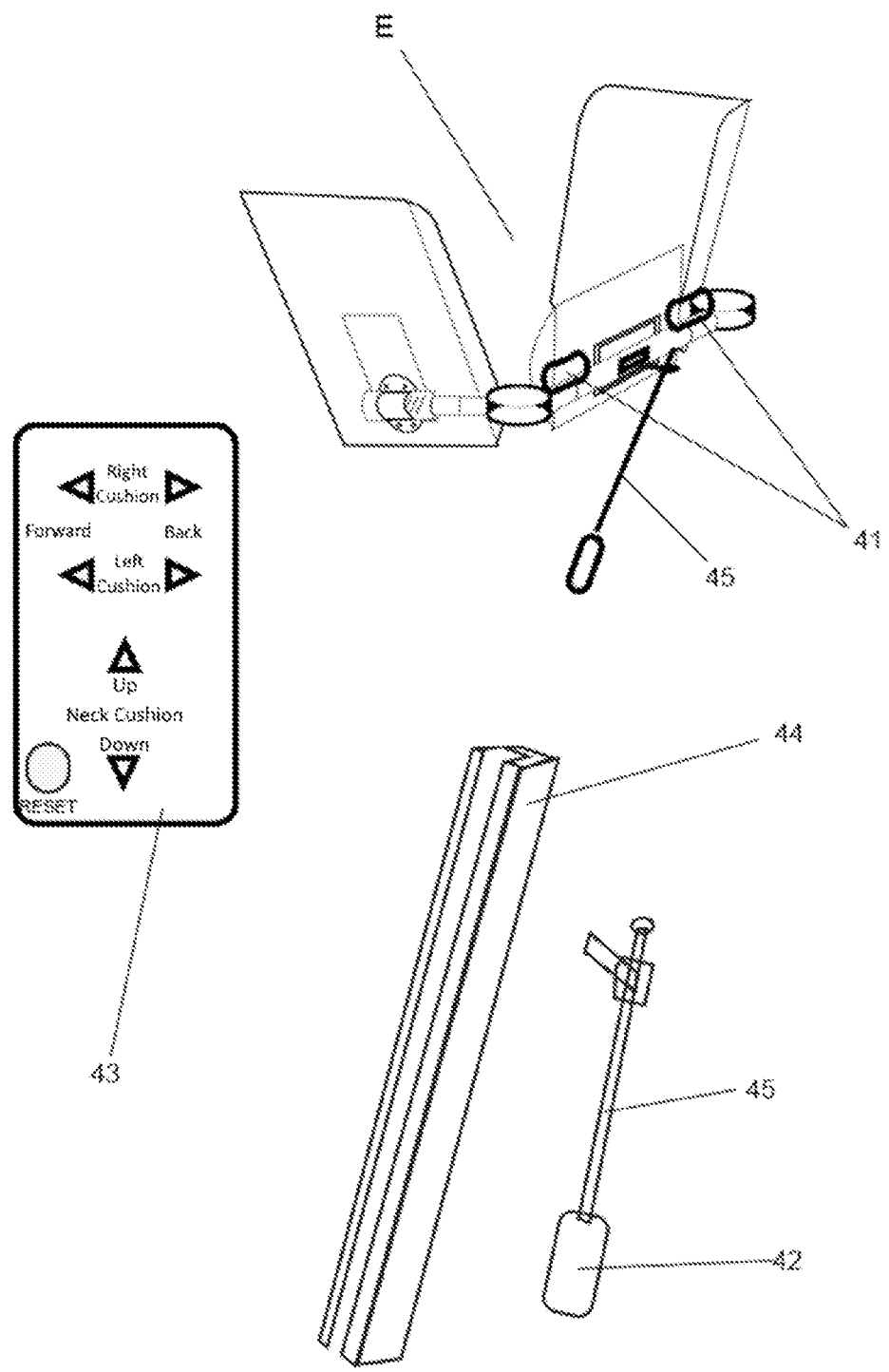
FIG. 19: Angle mechanism passenger seat sleep pillow with motorized system

The invention can be implemented in the manufacture of passenger seats as well as in the form of post-manufacture exterior assembly. It is also possible to manufacture the passenger seat with an angle mechanism as a sleep pillow motorized system (E) as shown in FIG. 19. From this point of view, it is a fact that a wide range of work and labor resources will be needed and provide resources for employment in terms of both the manufacture of the invention and its use with the pillow, the possibility of external mounting and the production of the motor system. After the patent to be obtained, the market research and marketing studies to be carried out with the registration of international patents will provide the opportunity to work for export. The angle mechanism (1) of the present invention is a product that can find wide use in the furniture sector in the domestic market.

The invention claimed is:

1. A passenger seat sleeping pillow to be used in front of the backrest, for increasing the comfort level of the passenger seat sleeping pillow, comprising:
    at least one neck pillow, the at least one neck pillow having a height that can be adjusted by an adjustment bar, to support the neck of a user;
    left and right headrest pillows that can move in two axes to support a head and cheeks of the user from the side, the left and right headrest pillows being located on both sides of the at least one neck pillow; and
    a mechanism that connects the neck pillow and the left and right headrest pillows to each other, the mechanism providing at least two axis movement to the left and right headrest pillows,
    wherein said mechanism comprises:
    at least one main body rod;
    angle mechanisms located at both ends of said main body rod to provide angular movement of said left and right headrest pillows from seat backrest to the front around a vertical axis;
    pillow mounting trays that provide connection of the left and right headrest pillows with the mechanism;
    pillow connection parts that provide connection of the pillow mounting trays with the angle mechanisms and that extend the left and right headrest pillows to the cheeks of the user;
    pillow angle springs positioned on the pillow connection parts to provide the movement of said left and right headrest pillows to outward and back inward position around a horizontal axis, after said left and right headrest pillows being opened from seat backrest to the front around the vertical axis; and
    angle-stepped turning heads positioned on the pillow connection parts in order to provide the angular movement of the left and right headrest pillows to outward position around the horizontal axis, after said left and right headrest pillows being opened from seat backrest to the front around the vertical axis.

2. The passenger seat sleeping pillow according to claim 1, further comprising:
    a neck pillow holder positioned on the neck pillow to provide connection of said neck pillow to the main body rod;
    a side neck pillow mounting tray positioned in said main body rod to provide connection to said neck pillow holder; and
    an adjustment bar mounting tray to which said adjustment bar is connected.

3. The passenger seat sleeping pillow according to claim 1, wherein said angle mechanisms comprises:
    an angle mechanism gear, the angle mechanism gear having teeth and providing a same number of movements with a number of teeth thereof, for providing angular movement of said left and right headrest pillows from seat backrest to the front around the vertical axis; and
    an angle mechanism lock that makes contact with the angle mechanism gear and stops at angles of 30-60-90° when the left and right headrest pillows reach the angles of 30-60-90° during the angular movement thereof.

4. The passenger seat sleeping pillow according to claim 1, further comprising an adjustment rod bearing located on the backrest, in which the adjustment rod will be bedded for making up and down height adjustment.

5. The passenger seat sleeping pillow according to claim 1, wherein for enabling the user to automatically direct the left and right headrest pillows and the neck pillow, comprises:
- a control panel that controls the angle mechanism and the adjustment rod;
- pillow angle motors;
- an adjusting rod up and down motor;
- an adjustment bar guide; and
- worm gear.

6. A passenger seat sleeping pillow to be used from sides of a backrest, for increasing the comfort level of the passenger seat sleeping pillow, comprising:
- at least one neck pillow, the at least one neck pillow having a height that can be adjusted by an adjustment bar, to support a neck of a user;
- at least one headrest pillow that can move in two axes to support a head and cheeks of the user from the side, the at least one headrest pillow being located on both sides of the at least one neck pillow; and
- a mechanism that connects the neck pillow and the at least one headrest pillow to each other, the mechanism providing at least two axis movement to the at least one headrest pillow,
wherein said mechanism comprises:
- at least one main body rod;
- laterally operating pillow elbows located at both ends of said main body rod to provide opening movement of said at least one headrest pillow from the sides of seat backrest to the front direction;
- pillow turning wheels to bring the at least one headrest pillow from a reclined position to a vertical position via rotational motion after the opening movement from the sides of the seat backrest;
- side-operated elbow springs located inside said elbows, the side-operated elbow springs enabling the at least one headrest pillow to be brought closer to the neck pillow;
- pillow mounting trays that provide connection of the at least one headrest pillow with the mechanism;
- pillow connection parts that provide connection of the pillow mounting tray with the elbows;
- pillow angle springs positioned on the pillow connection parts to provide the movement of said at least one headrest pillow from seat backrest to outward and back inward position around the pillow connection parts, after opening movement from the sides of the seat backrest and having vertical position via rotational motion of pillow turning wheels; and
- angle-stepped turning heads positioned on the pillow connection parts to provide angular movement of said at least one headrest pillows from seat backrest to outward direction around the pillow connection parts, after opening movement from the sides of the seat backrest and having vertical position via rotational motion of pillow turning wheels.

7. The passenger seat sleeping pillow according to claim 6, further comprising:
- a neck pillow mounting tray that provides connection of the neck pillow to the main body rod; and
- an adjustment bar mounting tray to which said adjustment bar is connected.

8. The passenger seat sleeping pillow according to claim 6, further comprising an adjustment rod bearing located on the backrest, in which the said adjustment rod will be bedded for making up and down height adjustment.

9. The passenger seat sleeping pillow according to claim 6, further comprising a side mounting pillow arm bearing located on the backrest, in which the elbow springs that allow the at least one headrest pillow to be brought closer to the neck pillow will be bedded.

10. The passenger seat sleeping pillow according to claim 6, wherein the pillow rotating wheel comprises a pillow wheel pin, a pillow wheel pin spring, a pillow wheel coupling hole, a pillow wheel pin locking bearing, and a pillow wheel mounting tray screw hole.

11. The passenger seat sleeping pillow according to claim 6, wherein for enabling the user to automatically direct the left and right headrest pillows and the neck pillow, comprises:
- a control panel that controls the angle mechanism and the adjustment rod;
- pillow angle motors;
- an adjusting rod up and down motor;
- an adjustment bar guide; and
- worm gear.

* * * * *